(12) United States Patent
Narayanaswamy (10) Patent No.: US 11,250,084 B2
(45) Date of Patent: Feb. 15, 2022

(54) METHOD AND SYSTEM FOR GENERATING CONTENT FROM SEARCH RESULTS RENDERED BY A SEARCH ENGINE

(71) Applicant: Sreedhara Srinivasulu Narayanaswamy, Bangalore (IN)

(72) Inventor: Sreedhara Srinivasulu Narayanaswamy, Bangalore (IN)

( * ) Notice: Subject to any disclaimer, the term of this patent is extended or adjusted under 35 U.S.C. 154(b) by 362 days.

(21) Appl. No.: 16/091,978

(22) PCT Filed: Apr. 6, 2017

(86) PCT No.: PCT/IN2017/050135
§ 371 (c)(1),
(2) Date: Oct. 6, 2018

(87) PCT Pub. No.: WO2017/175247
PCT Pub. Date: Oct. 12, 2017

(65) Prior Publication Data
US 2019/0095538 A1 Mar. 28, 2019

(30) Foreign Application Priority Data
Apr. 6, 2016 (IN) .............................. 201641012114

(51) Int. Cl.
*G06F 16/9535* (2019.01)
*G06F 16/951* (2019.01)
*G06F 16/338* (2019.01)
*G06F 16/2457* (2019.01)
*G06F 16/248* (2019.01)

(52) U.S. Cl.
CPC ........ *G06F 16/9535* (2019.01); *G06F 16/248* (2019.01); *G06F 16/24578* (2019.01); *G06F 16/338* (2019.01); *G06F 16/951* (2019.01)

(58) Field of Classification Search
CPC .. G06F 16/9535; G06F 16/338; G06F 16/951; G06F 16/248; G06F 16/24578
See application file for complete search history.

(56) References Cited

U.S. PATENT DOCUMENTS

| 9,286,397 B1 | 3/2016 | Suleman et al. | |
| 2007/0027839 A1* | 2/2007 | Ives .................... | G06F 16/9577 707/999.003 |
| 2010/0076994 A1* | 3/2010 | Soroca ................ | G06F 16/9577 707/769 |
| 2012/0095984 A1* | 4/2012 | Wren-Hilton ....... | G06F 16/9535 707/707 |

FOREIGN PATENT DOCUMENTS

WO 2007/012887 A1 2/2007

* cited by examiner

*Primary Examiner* — Kannan Shanmugasundaram
(74) *Attorney, Agent, or Firm* — Maschoff Brennan (57) ABSTRACT

The present invention provides an optimized generator for generating content from search results rendered by a search engine. In a web browser opened on an operating system, if a user is searching for a parameter on the search engine, the present invention provides options in the search engine to create localized or internationalization portable document format (PDF) file, a word document, an Excel™ spreadsheet (XLS), or a PowerPoint™ presentation (PPT), instantly.

13 Claims, 6 Drawing Sheets

METHOD AND SYSTEM FOR GENERATING CONTENT FROM SEARCH RESULTS RENDERED BY A SEARCH ENGINE

FIELD OF THE INVENTION

The present invention generally relates to content generation and more particularly to a method and system for generating content from search results rendered by a search engine.

BACKGROUND TO THE INVENTION

Users of electronic devices typically carry out searches using the electronic devices. For instance, a user opens a web browser and inputs a search parameter in a search box of the search engine. The user is then provided with multiple search results that are in form of uniform resource locators (URLs). The user then goes through each result and checks content which is a very tedious and time-consuming process. Mostly, the user does not find relevant content in some of the search results. Also, there is a tendency of the user to miss out on viewing relevant content due to the multiple search results.

SUMMARY OF THE INVENTION

This summary is provided to introduce a selection of concepts in a simplified format that are further described in the detailed description of the invention. This summary is not intended to identify key or essential inventive concepts of the subject matter, nor is it intended for determining the scope of the invention.

The present invention provides an optimized generator for generating content from search results rendered by a search engine. In a web browser opened on an operating system, if a user is searching for a parameter on the search engine; the present invention provides options in the search engine to create localized or internationalization portable document format (PDF) file, a word document, an Excel™ spreadsheet (XLS), or a PowerPoint™ presentation (PPT), or a multimedia object which may include a graphic object, such as an image file and may also include an audio file or a video file instantly.

In an embodiment, a method for generating content from search results rendered by a search engine is disclosed. The method includes generating a plurality of search results to a client device communicatively coupled to the server. The method includes copying, content resulted from the search queries, to a local directory. The method includes sorting, by the server, the content in response to instructions by a user received through the search interface. The method analyses the search pattern of the sorted content. The method includes extracting and aggregating, the content into a customized document based on the instructions of the user. The method enables documents in a portable document format in response to the aggregated content. The method outputs to a display device in a user interface, at least a portion of the result set based on the analysed content in the portable document format.

In an embodiment, a system for generating content from search results rendered by a search engine is disclosed. The system comprises at least one memory; and at least one processor and a server of the system, the at least one processor being communicatively coupled to the at least one memory, the at least one processor being configured to execute instructions to enable performing generating content from search results, and the at least one processor further being configured to execute instructions, as part of enabling the generation of content from search results, to generate a plurality of search results to a client device communicatively coupled to the server, copy content resulted from the search queries, to a local directory, sort the content in response to instructions by a user received through the search interface, analyse the search pattern of the sorted content, extract and aggregate the content into a customized document based on the instructions of the user, enable documents in a portable document format in response to the aggregated content, and output to a display device in a user interface, at least a portion of the result set based on the analysed content in the portable document format.

To further clarify advantages and features of the present invention, a more particular description of the invention will be rendered by reference to specific embodiments thereof, which is illustrated in the appended figures. It is appreciated that these figures depict only typical embodiments of the invention and are therefore not to be considered limiting of its scope. The invention will be described and explained with additional specificity and detail with the accompanying figures.

BRIEF DESCRIPTION OF THE FIGURES

The invention will be described and explained with additional specificity and detail with the accompanying figures in which.

Further, skilled artisans will appreciate that elements in the figures are illustrated for simplicity and may not have been necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having benefit of the description herein.

DESCRIPTION OF THE INVENTION

For the purpose of promoting an understanding of the principles of the invention, reference will now be made to the embodiment illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying figures.

Figure 1:
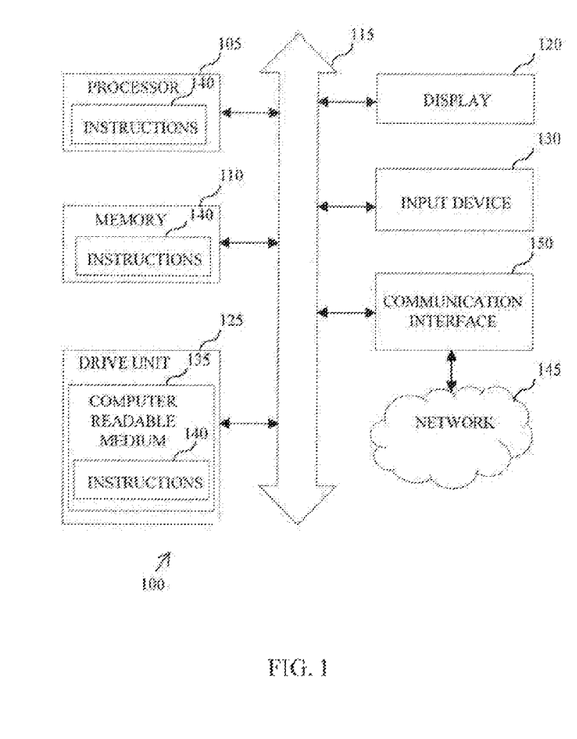
FIG. 1 illustrates a block diagram of an electronic device, in accordance with one embodiment.

Referring to FIG. 1, a block diagram of an electronic device 100 is illustrated which is representative of a hardware environment for practicing the present invention. The electronic device 100 can include a set of instructions that can be executed to cause the electronic device 100 to perform any one or more of the methods disclosed. The electronic device 100 may operate as a standalone device or can be connected, for example using a network, to other electronic devices or peripheral devices.

In a networked deployment of the present invention, the electronic device 100 may operate in a server-client user network environment, or as a peer electronic device in a peer-to-peer (or distributed) network environment. The electronic device 100 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. Further, while a single electronic device 100 is illustrated, the term "device" shall also be taken to include any collection of systems or sub-systems that individually or jointly execute a set, or multiple sets, of instructions to perform one or more computer functions.

The electronic device 100 can include a processor 105, for example a central processing unit (CPU), a graphics processing unit (GPU), or both. The processor 105 can be a component in a variety of systems. For example, the processor 105 can be part of a standard personal computer or a workstation. The processor 105 can be one or more general processors, digital signal processors, application specific integrated circuits, field programmable gate arrays, servers, networks, digital circuits, analog circuits, combinations thereof, or other now known or later developed devices for analyzing and processing data. The processor 105 can implement a software program, such as code generated manually (for example, programmed).

The electronic device 100 can include a memory 110, such as a memory 110 that can communicate via a bus 115. The memory 110 can include a main memory, a static memory, or a dynamic memory. The memory 110 can include, but is not limited to, computer readable storage media such as various types of volatile and non-volatile storage media, including but not limited to, random access memory, read-only memory, programmable read-only memory, electrically programmable read-only memory, electrically erasable read-only memory, flash memory, magnetic tape or disk, optical media and the like. In one example, the memory 110 includes a cache or random access memory for the processor 105. In alternative examples, the memory 110 is separate from the processor 105, such as a cache memory of a processor, the system memory, or other memory. The memory 110 can be an external storage device or database for storing data. Examples include a hard drive, compact disc ("CD"), digital video disc ("DVD"), memory card, memory stick, floppy disc, universal serial bus ("USB") memory device, or any other device operative to store data. The memory 110 is operable to store instructions executable by the processor 105. The functions, acts or tasks illustrated in the figures or described can be performed by the programmed processor 105 executing the instructions stored in the memory 110. The functions, acts or tasks are independent of the particular type of instructions set, storage media, processor or processing strategy and can be performed by software, hardware, integrated circuits, firmware, micro-code and the like, operating alone or in combination. Likewise, processing strategies can include multiprocessing, multitasking, parallel processing and the like.

As shown, the electronic device 100 can further include a display unit 120, for example a liquid crystal display (LCD), an organic light emitting diode (OLED), a flat panel display, a solid state display, a cathode ray tube (CRT), a projector, a printer or other now known or later developed display device for outputting determined information. The display 120 can act as an interface for a user to see the functioning of the processor 105, or specifically as an interface with the software stored in the memory 110 or in a drive unit 125.

Additionally, the electronic device 100 can include an input device 130 configured to allow the user to interact with any of the components of the electronic device 100. The input device 130 can include a stylus, a number pad, a keyboard, or a cursor control device, for example a mouse, or a joystick, touch screen display, remote control or any other device operative to interact with the electronic device 100.

The electronic device 100 can also include the drive unit 125. The drive unit 125 can include a computer-readable medium 135 in which one or more sets of instructions 140, for example software, can be embedded. Further, the instructions 140 can embody one or more of the methods or logic as described. In a particular example, the instructions 140 can reside completely, or at least partially, within the memory 110 or within the processor 105 during execution by the electronic device 100. The memory 110 and the processor 105 can also include computer-readable media as discussed above.

The present invention contemplates a computer-readable medium that includes instructions 140 or receives and executes the instructions 140 responsive to a propagated signal so that a device connected to a network 145 can communicate voice, video, audio, images or any other data over the network 145. Further, the instructions 145 can be transmitted or received over the network 145 via a communication port or communication interface 150 or using the bus 115. The communication interface 150 can be a part of the processor 105 or can be a separate component. The communication interface 150 can be created in software or can be a physical connection in hardware. The communication interface 150 can be configured to connect with the network 145, external media, the display 120, or any other components in the electronic device 100 or combinations thereof. The connection with the network 145 can be a physical connection, such as a wired Ethernet connection or can be established wirelessly as discussed later. Likewise, the additional connections with other components of the electronic device 100 can be physical connections or can be established wirelessly. The network 145 can alternatively be directly connected to the bus 115.

The network 145 can include wired networks, wireless networks, Ethernet AVB networks, or combinations thereof. The wireless network can include a cellular telephone network, an 802.11, 802.16, 802.20, 802.1Q or WiMAX network. Further, the network 145 can be a public network, such as the Internet, a private network, such as an intranet, or combinations thereof, and can utilize a variety of networking protocols now available or later developed including, but not limited to TCP/IP based networking protocols.

In an alternative example, dedicated hardware implementations, such as application specific integrated circuits, programmable logic arrays and other hardware devices, can be constructed to implement various parts of the electronic device 100.

One or more examples described can implement functions using two or more specific interconnected hardware modules or devices with related control and data signals that can be communicated between and through modules, or as portions of an application-specific integrated circuit. Accordingly, the present system encompasses software, firmware, and hardware implementations.

The system described can be implemented by software programs executable by an electronic device. Further, in a non-limited example, implementations can include distributed processing, component/object distributed processing, and parallel processing. Alternatively, virtual electronic device processing can be constructed to implement various parts of the system.

The system is not limited to operation with any particular standards and protocols. For example, standards for Internet and other packet switched network transmission (for example, TCP/IP, UDP/IP, HTML, and HTTP) can be used. Such standards are periodically superseded by faster or more efficient equivalents having essentially the same functions. Accordingly, replacement standards and protocols having the same or similar functions as those disclosed are considered equivalents thereof.

Example schematic diagram representations of generation and working of an optimized generator in the electronic device 100 are explained in detail with reference to FIGS. 2-4.

Figure 2:
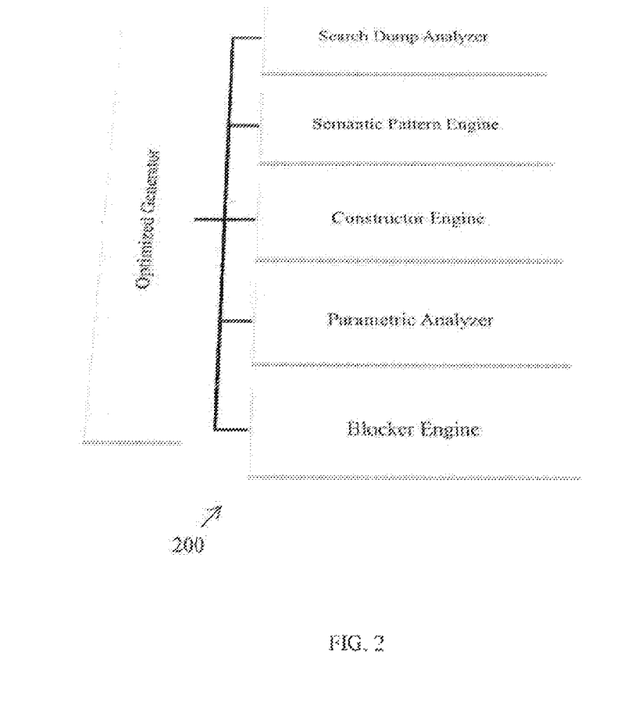
FIG. 2 is a block diagram representation of an optimized generator, in accordance with an embodiment.

FIG. 2 is a block diagram representation 200 of an optimized generator, in accordance with an embodiment. The optimized generator is used for generating content from search results rendered by a search engine. Examples of the search engine include, but are not limited to, Google, Yahoo, and Bing. In one example, the optimized generator operates as an application that can be applied to an internet browser. The optimized generator further operates on a suitable operating system for a search engine. The optimized generator includes multiple components illustrated in FIG. 2 and which is described below.

A search-dump analyser in the optimized generator dumps search content which has been executed from a search engine. The search-dump analyser further analyses a pattern of the search content.

A semantic pattern engine in the optimized generator analyses a search pattern parameter. The semantic pattern engine also correlates and creates a method to analyse and format the search content into a portable document format (PDF) file, a word document, an Excel™ spreadsheet (XLS), or a PowerPoint™ presentation (PPT, or a multimedia object which may include a graphic object, such as an image file and may also include an audio file or a video file.

As an exemplary embodiment, when a user enters a search term for searching audio or video, the system may retrieve results from an existing audio sources or video repository systems (for example, YouTube™).

As another exemplary embodiment, when a user enters a search term for searching images, the system may retrieve results from an existing image repository systems. The system may retrieve the relevant image frames and the two or more image frames may be stitched together.

A constructor engine in the optimized generator formulates a pattern of the search content into meaningful paragraphs, bullet-points, images embedded in the PDF, the word document, the XLS, and also videos in the PPT.

A parametric analyser in the optimized generator performs analysis based on user selection of small, medium, large options to create localized or internationalization formats of the PDF, the word document, the XLS, and the PPT instantly from the search engine. The parametric analysersti can be limited to content creation.

A blocker engine in the optimized generator blocks content that is unrelated to the search results, for example content that is pornographic, terror related, plagiarized content that does not have proper references, and the like.

Figure 3:
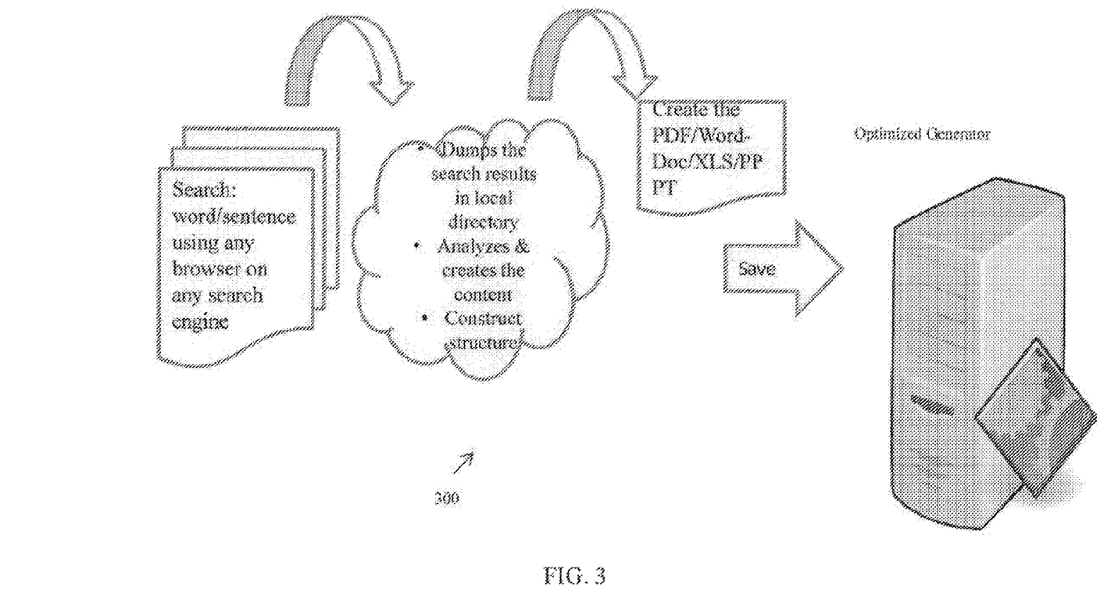
FIG. 3 is a schematic diagram illustrating operation of an optimized generator, in accordance with an embodiment.

FIG. 3 is a schematic diagram 300 illustrating operation of the optimized generator, in accordance with an embodiment. As illustrated in FIG. 3, words or sentences are searched using a browser from the search engine. The search results are dumped in a local directory. The search results are further analyzed and content is created based on the analysis. Structure of the content is further created. The content is further generated in form of the PDF, the word document, the XLS, or the PPT, and is instantly available to the user. The PDF, the word document, the XLS, or the PPT can further be saved or stored.

Figure 4:
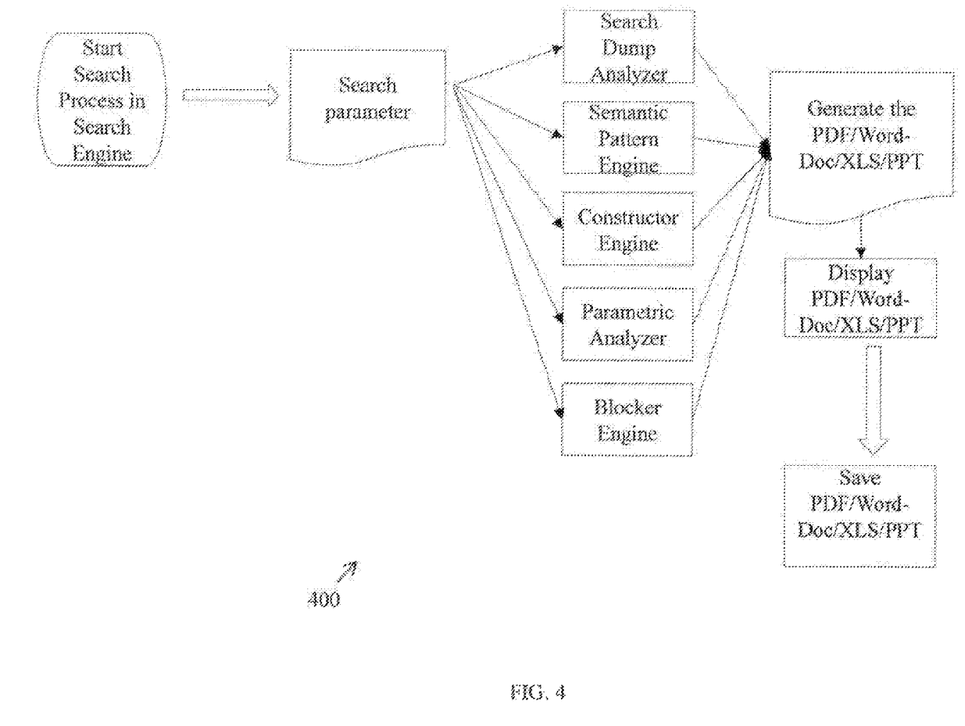
FIG. 4 is a schematic diagram illustrating a workflow of an optimized generator, in accordance with an embodiment.

FIG. 4 is a schematic diagram 400 illustrating a workflow of the optimized generator, in accordance with an embodiment. The workflow is as described with reference to FIG. 2 and FIG. 3 and is not explained herein for sake of brevity.

Figure 5:
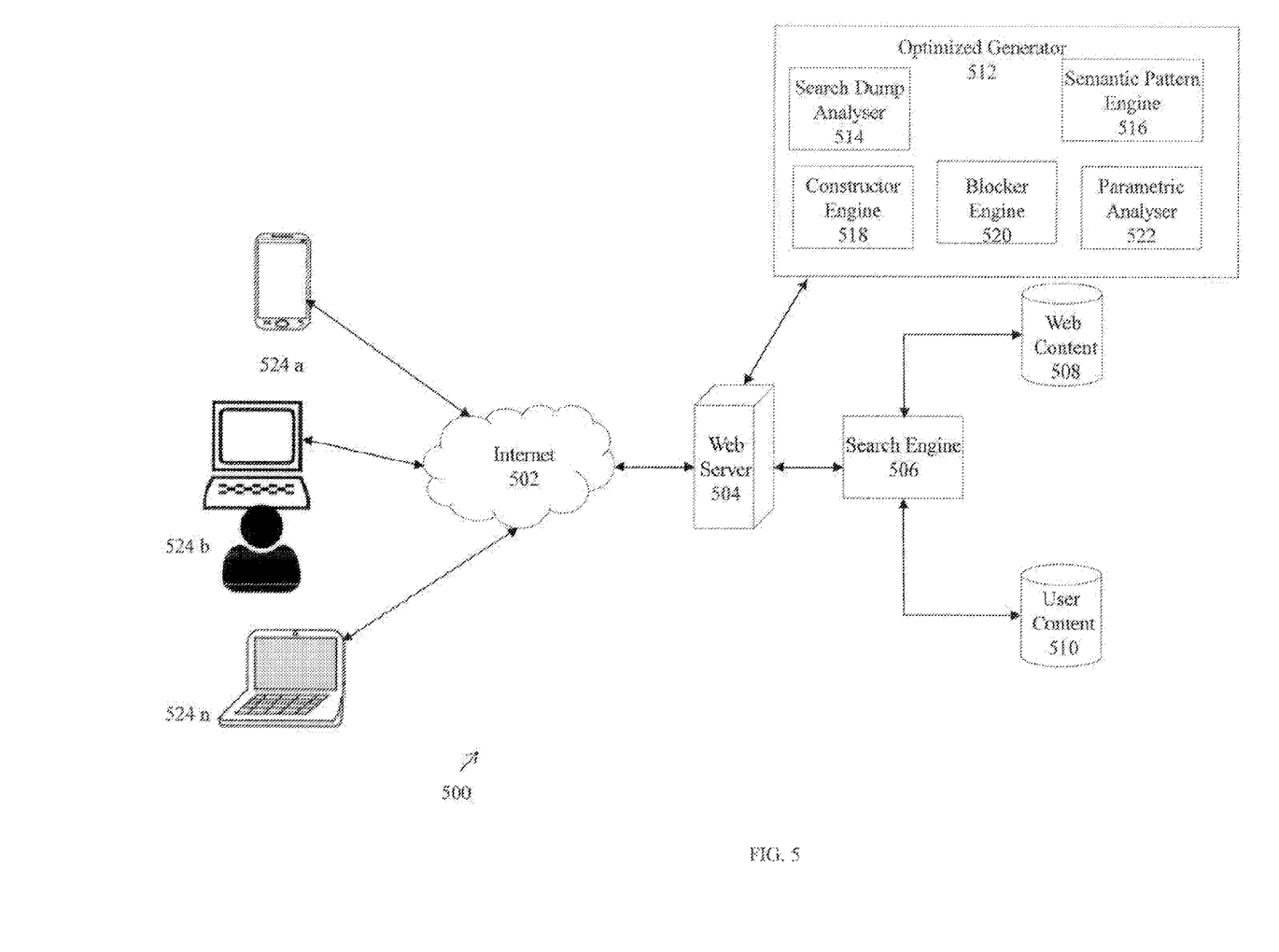
FIG. 5 illustrates a block diagram for generating content from search results rendered by a search engine.

FIG. 5 is a system diagram 500 illustrating a system 500 including a web server 504 in communication with a search engine 506 and databases for maintaining web content 508 and user content 510. The system 500 further includes a network 502, such as the Internet, a user computer 524 a-n and a user.

The web server 504 may be any suitable type of server including processing operations allowing the user to access the server 504 via the network 502 for the performance of various operations, including a search operation. The web server 504 may include optimized generator 512 for generating content from search results rendered by a search engine The optimized engine may further include search dump analyser 514, semantic pattern engine 516, constructor engine 518, blocker engine 520, parametric analyser 522. The search-dump analyzer 514 in the optimized generator dumps search content which has been executed from the search engine. The search-dump analyser further analyses a pattern of the search content. The semantic pattern engine 516 in the optimized generator 512 analyses a search pattern parameter.

The semantic pattern engine also correlates and creates a method to analyse and format the search content into a portable document format (PDF) file, a word document, an Excel™ spreadsheet (XLS), or a PowerPoint™ presentation (PPT). The constructor engine 518 in the optimized generator 512 formulates a pattern of the search content into meaningful paragraphs, bullet-points, images embedded in the PDF, the word document, the XLS, and also videos in the PPT. The parametric analyzer 522 in the optimized generator 512 performs analysis based on user selection of small, medium, large options to create localized or internationalization formats of the PDF, the word document, the XLS, and the PPT instantly from the search engine. The parametric analyzer 522 can be limited to content creation. the blocker engine 520 in the optimized generator 512 blocks content that is unrelated to the search results, for example content that is pornographic, terror related, plagiarized content that does not have proper references, and the like.

The search engine 506 may be processing operations performed by one or more processing devices, wherein the processing operations include operations described herein relating to rating of user generated content with respect to search results. The operations of the search engine may be performed in response to executable instructions, wherein in one embodiment those instructions may be received from any suitable computer readable medium.

The databases 508 and 510 may be one or more data storage devices having information stored therein. It is recognized that the databases 508 and 510 may be illustrated as a single data storage unit, but for clarity purposes, the database 508 is illustrated as storing static or general web content and the database 510 stores user content, as described in further detail below.

The Internet 502 may be any suitable network connection as recognized by one skilled in the art, the user computer 524 a-n may also be any suitable type of computing device operative to communicate with the server 504 via the Internet 502 and operative to receive user input, for example a search request, from the user The search engine 506 is operative to perform processing operations for rating user content with respect to search results generated therein.

Figure 6:
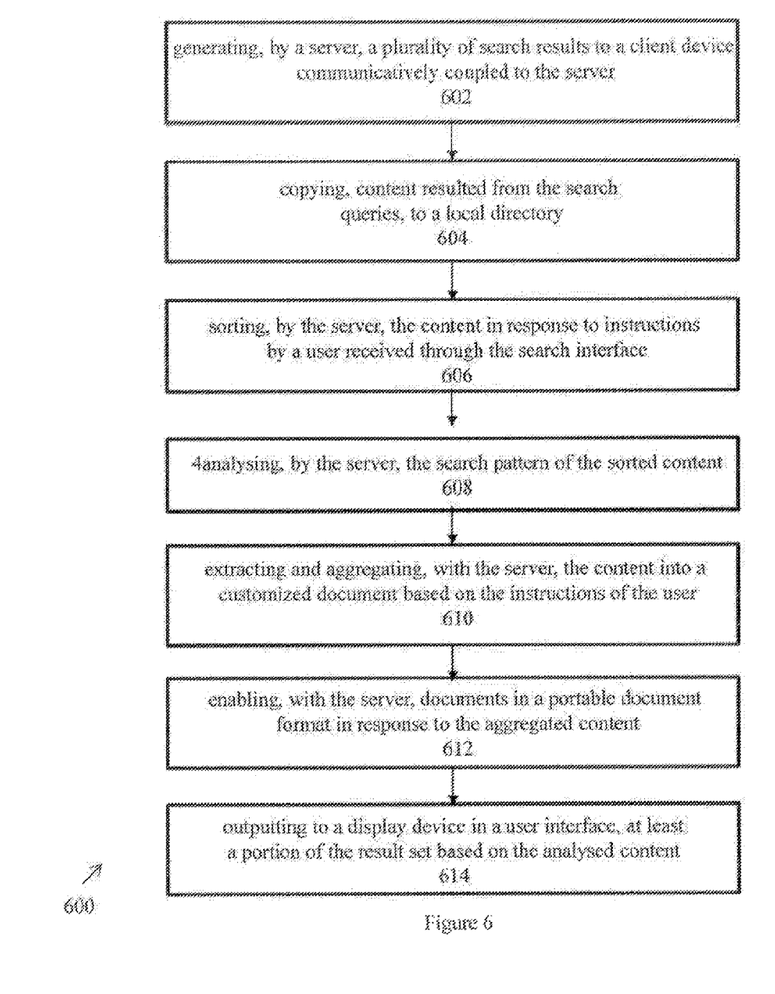
FIG. 6 illustrates a process flow for generating content from search results rendered by a search engine.

FIG. 6 illustrates a process flow 600 for implementing the system 500. At step 602, search results may be generated by a server to a client device communicatively coupled to the server. At step 604, content resulted from the search queries may be copied to a local directory. At step 606, the content in response to instructions by a user received through the search interface may be sorted. At step 608, the search pattern of the sorted content may be analysed. At step 610, the content into a customized document based on the instructions of the user may be extracted and aggregated. At step 612 documents in a portable document format may be enabled in response to the aggregated content. At step 614, a portion of the result set based on the analysed content in the portable document format may be outputted to a display device in a user interface Various embodiments disclosed herein provide numerous advantages by providing a method and system for generating content from search results rendered by a search engine. The present invention provides an optimized generator that generates content in a structured and easy-to-read format in response to a search parameter provided by a user on a search engine. The search parameter can be provided by the user on an operating system and using an internet browser. The content can be provided in multiple versions (for example PDF, word document, XLS or PPT). The user hence saves time by not having to read through multiple search results and only having to read a single document of consolidated content.

While specific language has been used to describe the disclosure, any limitations arising on account of the same are not intended. As would be apparent to a person in the art, various working modifications may be made to the method in order to implement the inventive concept as taught herein.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The invention claimed is:

1. A method for generating relevant contents from search results rendered by a search engine, the method comprising:
   receiving by a search dump analyser of an optimized generator, content of the search results resulted from a search query, to a local directory of a client device; wherein the search dump analyser is configured for analyzing a search pattern of the content of the search results;
   analysing, by a semantic pattern engine of the optimized generator, the content of the search results using a search parameter and the search pattern resulted from the search dump analyser for correlating the content of the search results resulted from the search query;
   extracting and aggregating, by the optimized generator, relevant contents from the analysed content based on the instructions of a user;
   formulating, by the optimized generator, the relevant contents into meaningful paragraphs;
   wherein the optimized generator comprises a constructor engine configured for formulating the relevant contents into meaningful paragraphs including bullet-points, images embedded in the Portable Document Format (PDF), a word document, a spreadsheet file, and videos in a presentation format;
   generating, customized documents by consolidating the aggregated and the formulated relevant contents; and
   outputting on a display device of a user interface, the customized documents in at least one of the portable document format, the word document, the spreadsheet file and videos in the presentation format.

2. The method of claim 1, wherein the optimized generator is configured to operate as an application applied to an internet browser of the client device.

3. The method of claim 1, wherein blocking the content of the search results that is unrelated to the search results and the search query, by a blocker engine in the optimized generator.

4. The method of claim 1, wherein analysing the search pattern of the content of the search results includes analysis of keywords, terms, and data input fields, hyperlinks, frequency of keywords and combination thereof.

5. The method of claim 1, wherein the content is optimized by formulating the relevant content of the search results into meaningful paragraphs.

6. The method of claim 1, wherein receiving the content of the search results which has been executed from the search engine by the search dump analyser.

7. A system for generating relevant contents from search results rendered by a search engine, the system comprising:
   at least one processor and,
   at least one memory storing an optimized generator, wherein the at least one processor being communicatively coupled to the at least one memory, the at least one processor being configured to execute instructions for:
   receiving content of the search results resulted from a search query, to a local directory of a client device;
   analyzing a search pattern of the content of the search results;
   analysing, the content of the search results using a search parameter and the search pattern for correlating the content of the search results resulted from the search query;
   extracting and aggregating relevant contents from the analysed content based on the instructions of a user;
   formulating the relevant contents into meaningful paragraphs including bullet-points, images embedded in the Portable Document Format (PDF), a word document, a spreadsheet file, and videos in a presentation format;
   generating customized documents by consolidating the aggregated and the formulated relevant contents; and
   outputting on a display device of a user interface, the customized documents in flail at least one of the portable document format, the word document, the spreadsheet file and videos in the presentation format.

8. The system of claim 7, wherein the optimized generator is configured for generating the relevant contents from search results rendered by the search engine.

9. The system of claim 7, wherein a semantic pattern engine of the optimized generator analyses the search parameter and the search pattern of the content of the search results resulted from the search query.

10. The system of claim 7, wherein a blocker engine of the optimized generator is configured for blocking the search content that is unrelated to the search results and the search query.

11. The system of claim 7, wherein the search pattern analysis includes analysis of keywords, terms, and data input fields, hyperlinks, frequency of keywords or combination thereof.

12. The system of claim 7, wherein the content is optimized by formulating the relevant contents into meaningful paragraphs.

13. The system of claim 7, wherein a search dump analyser dumps the search content which has been executed from the search engine.

* * * * *